United States Patent
Nakamura et al.

(10) Patent No.: US 8,078,915 B2
(45) Date of Patent: Dec. 13, 2011

(54) SYSTEM AND METHOD FOR VERIFYING OPERATION OF A TARGET SYSTEM

(75) Inventors: Hiroaki Nakamura, Yokohama (JP); Kohichi Ono, Wakabaya (JP)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 12/359,376

(22) Filed: Jan. 26, 2009

(65) Prior Publication Data
US 2009/0193294 A1 Jul. 30, 2009

(30) Foreign Application Priority Data
Jan. 28, 2008 (JP) ................................. 2008-016771

(51) Int. Cl.
*G06F 11/00* (2006.01)
(52) U.S. Cl. .......................................... 714/37; 714/26
(58) Field of Classification Search ................ 714/26, 714/37, 1, 2, 30, 31, 45
See application file for complete search history.

(56) References Cited

U.S. PATENT DOCUMENTS

| | | | | |
|---|---|---|---|---|
| 5,272,704 A | * | 12/1993 | Tong et al. .................. | 714/26 |
| 6,907,545 B2 | * | 6/2005 | Ramadei et al. ............. | 714/25 |
| 7,139,676 B2 | * | 11/2006 | Barford ....................... | 702/183 |
| 7,379,846 B1 | * | 5/2008 | Williams et al. ............. | 702/185 |
| 2006/0150018 A1 | * | 7/2006 | Cousin et al. ................ | 714/26 |

OTHER PUBLICATIONS

Henrik Thane, "Debugging Using Time Machines: Replay Your Embedded Systems History", Nov. 2001, Real-Time & Embedded Computing Conference, p. Kap 22, Milan, Italy.
Hans Hansson, "RTS Debugging", Malardalen Real-Time Research Centre, 2003.

\* cited by examiner

*Primary Examiner* — Scott Baderman
*Assistant Examiner* — Sarai Butler
(74) *Attorney, Agent, or Firm* — Vazken Alexanian

(57) ABSTRACT

A system, a computer readable article of manufacture, and a method for verifying operation of a target system to be inspected. The system includes an abstract binary tree generation unit and a matching unit. The abstract binary tree generation unit obtains information about a functional specification of the target system and generates one or more binary trees that associate one or more states that can occur in the target system with respective nodes and that associate state transitions of objects constituting the target system and interactions between the objects with connection relationships between the nodes. The matching unit receives an event sequence in an application model of the target system obtained in response to the operation of the target system and matches the event sequence against the binary trees generated by the abstract binary tree generation unit. The method includes steps for accomplishing the functionality of the system.

15 Claims, 10 Drawing Sheets

SEQUENCE DIAGRAM (a)

(b)

(c)

SYSTEM AND METHOD FOR VERIFYING OPERATION OF A TARGET SYSTEM

CROSS-REFERENCE TO RELATED APPLICATIONS

This application claims priority under 35 U.S.C. §119 from Japanese Patent Application No. 2008-16771 filed Jan. 28, 2008, the entire contents of which are incorporated herein by reference.

BACKGROUND OF THE INVENTION

1. Field of the Invention

The present invention relates to a system for verifying the operation of a target system, and more specifically, it relates to a system and method for observing and verifying the operation of a target system to be inspected while determining a variety of inspection conditions, and computer readable article of manufacture to implement the method of the present invention.

2. Description of the Related Art

Inspecting the operation of a real-time system, which requires processing in real time, or an embedded system, embedded in various types of devices, requires observation of the behavior of the system by actually executing software using an evaluation board or hardware of an actual device. Observation of the behavior of the system is carried out by a probe added to hardware and software. Due to the real-time nature of this type of system's operation, it is desirable that the effects (intrusion) of observation by a probe and the processing of obtained data on the system's operation performance be minimized.

One known example of this kind of technique is BlackBox Technology from the Swedish company ZealCore. See Henrik Thane, Daniel Sundmark, "Debugging Using Time Machines: Replay Your Embedded System's History", Real-Time & Embedded Computing Conference, p Kap 22, Milan, Italy, November, 2001. This known technique is one by which a system's operation is recorded and the recorded operation is reproduced. This technique aims to use a record of the system's operation recorded until a crash in order to determine the cause of the crash when the system crashes. This technique observes system behavior using probe code embedded in the system in conjunction with a code generation technique. The CPU time required for observation and processing by probe code is reduced relative to the entire computation time provided by the processor of the system. See Hans Hansson, "RTS Debugging", MALARDALEN REAL-TIME RESEARCH CENTRE, 2003, searched on Oct. 11, 2007, on the Internet at http://www.artes.uu.se/industry/031111/de-bugginq-ZC-031111.pdf. Although the amount of information of the system's operation in itself is enormous, the amount of information actually recorded can fall within a practical range by recording only information sufficient for reproduction of the operation.

As described above, inspecting the operation of a real-time system or an embedded system requires actually operating the system to be inspected and observing the behavior of the system. Intrusion of the observation and processing of obtained data is preferably small.

Debugging a target system requires inspection of the target system's operation, including various items, such as, verification of a functional specification and sufficiency of performance requirements. Necessary information varies depending on what kind of inspection is conducted. Accordingly, observation for general purpose use is inefficient and it is difficult to reduce intrusion.

In ZealCore's BlackBox technique, operation of a system to be inspected is observed and the information is recorded. However, the recording is aimed at determining the cause of a system crash so it does not support many other events required for debugging a system.

SUMMARY OF THE INVENTION

The present invention is made in view of the aforementioned problems. It is therefore an object of the present invention to provide a system, a method for observing and verifying the operation of a target system to be inspected while determining a variety of inspection conditions, and computer readable article of manufacture to implement the method of the present invention. It is another object of the present invention to reduce intrusion on operation performance of a target system to be inspected occurring in verification of the operation of the target system.

Accordingly, in one aspect, the present invention provides a system for verifying operation of a target system to be inspected. It includes a binary-tree generating unit and a matching unit. The binary-tree generating unit obtains information about a functional specification of the target system. It generates one or more binary trees that associate one or more states that can occur in the target system with respective nodes. The binary trees also associate state transitions of objects constituting the target system and interactions between the objects with connection relationships between the nodes. The matching unit receives an event sequence in an application model of the target system obtained in response to the operation of the target system. It then matches the event sequence against the binary trees generated by the binary-tree generating unit.

In another aspect, the present invention provides a method for verifying operation of a target system to be inspected. The method includes an obtaining step of obtaining a state transition diagram of each object and a sequence diagram for each use case of the target system as information about a functional specification of the target system, a binary-tree generating step of generating one or more binary trees that associate one or more states that can occur in the target system with respective nodes on the basis of information about state transitions obtained from the state transition diagrams and information about interactions obtained from the sequence diagram and that associate state transitions of the objects constituting the target system and interactions between the objects with connection relationships between the nodes, and a matching step of receiving an event sequence in an application model of the target system obtained in response to the operation of the target system and of matching the event sequence against the generated binary trees.

In still another aspect, the present invention is a computer readable article of manufacture that serves the functions of the above system by controlling a computer or making a computer execute processes corresponding to the steps in the above method. The computer readable article of manufacture can be provided by magnetic disks, optical disks, semiconductor memories, or other storage media.

According to the present invention described above, the operation of a target system to be inspected can be observed and verified while various inspection conditions are determined. In addition, according to the present invention, intru-

DETAILED DESCRIPTION OF THE PREFERRED EMBODIMENTS

Figure 1:
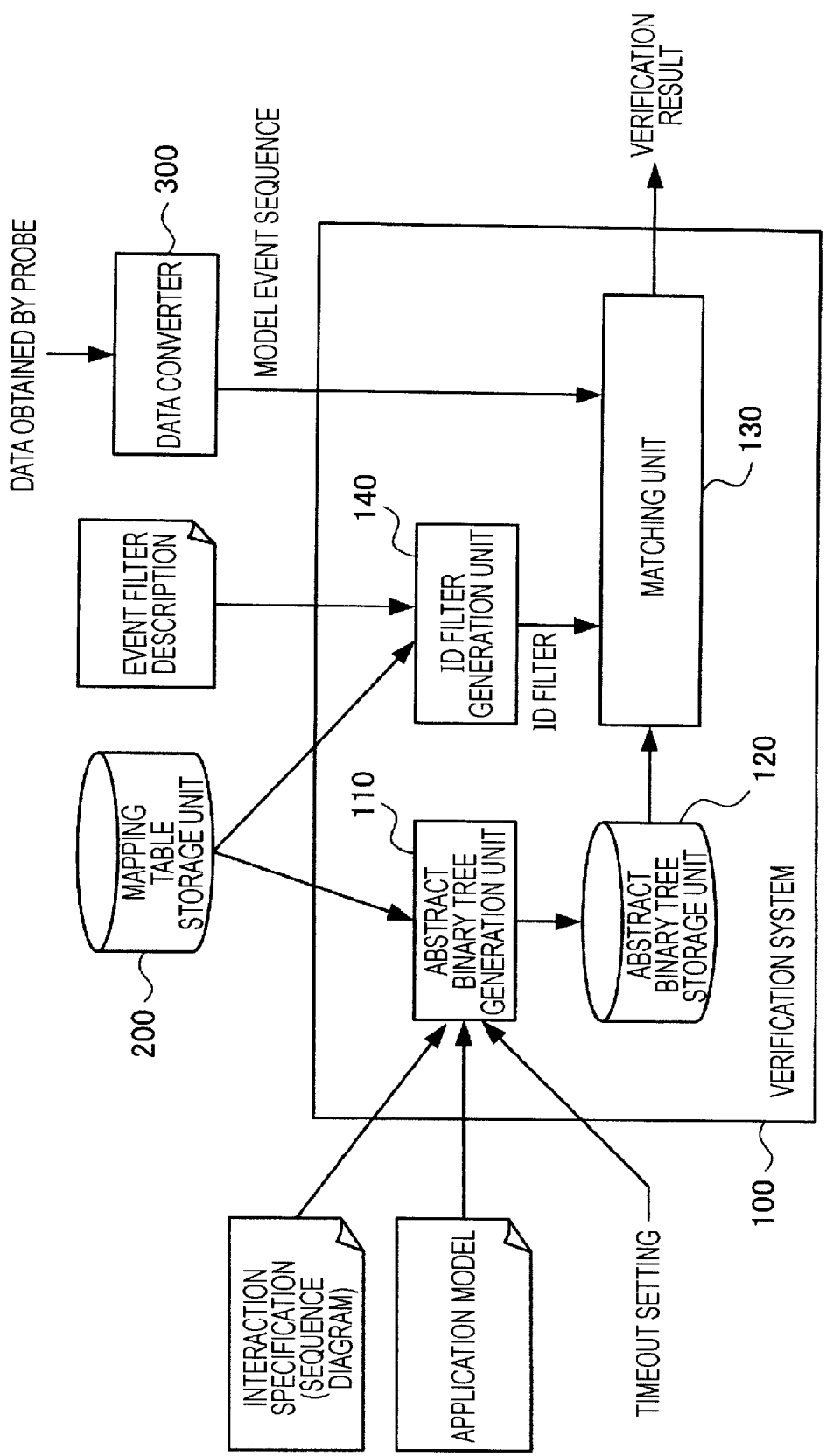
FIG. 1 illustrates a functional configuration of a verification target system according to an embodiment.

The embodiments of the present invention will be further described below with reference to the accompanying drawings.

In the system of the present invention, it is determined whether an application meets a functional specification of a target system to be inspected; the target system having been developed by model driven architecture. The functional specification of the target system to be inspected is described as an application model in, for example, the unified modeling language (UML). The target system executes code written in C or C++ automatically generated by the application model.

The application model of the target system is formed from a plurality of state machines (objects). The state machines are small units of elements that constitute the target system and that serve a predetermined function (not limited to hardware). Any unit of an element can be a state machine so it can be determined according to the details of inspection. Each of the state machines is defined by a state transition diagram. The state transition diagram may be an existing one provided using, for example, UML.

When a predetermined state machine reaches a predetermined state or when a predetermined state transition occurs, an accompanying action (behavior) is provided independently of the definition of the state transition diagram. The action provides behavior of each component of a target system at each phase. Also described in the action are interactions between the state machines provided by message communication. The interactions enable the state machines to cooperate with each other and function as the entire target system. The action is represented by an action description language that describes specific processing of the target system. Examples of the action description language include an original special-purpose language and an existing programming language.

Verification that an application developed by a model driven architecture meets a functional specification requires verification that the state transition of each of the state machines and the interactions between the state machines follow the functional specification. When the state transitions and the interactions are abstracted as an event in the application model, the verification problem is equivalent to a problem of verifying whether an event sequence is included in a pattern allowed by the functional specification. As a result, the verification problem is similar to the string pattern matching problem.

However, dynamic verification when the target system is a real-time system or an embedded system differs from string pattern matching on the following three points.

First, in execution of code, such as C or C++, generated by the application model, the occurrence frequency of a state transition or interaction is approximately once in one thousand to several thousand machine cycles. In other words, in dynamic verification in the present embodiment, unlike pattern matching performed after all of the string is provided, it is necessary to match individual events occurring discretely. Because matching of one event is required to be completed in approximately one thousand machine cycles, speed enhancement corresponding to that frequency is necessary.

Second, the dynamic verification in the present embodiment needs to be performed on a board (evaluation board or board of an actual device) that is not far from a probe for observing behavior of the target system. Therefore, there are hardware constraints of the board for verification, in particular, memory capacity constraints. For the string pattern matching, the speed of the matching process can be increased by development of a pattern provided in, for example, an autonomous table for matching a regular expression to an equivalent state transition. In contrast, for the dynamic verification in the present embodiment, the range of an operation scenario may be very wide, which increases the number of specifications corresponding to patterns. If developed, an enormous amount of memory would be required, and this leads to difficulty in satisfying the hardware constraints.

Third, behaviors of state machines in target system operation can parallel each other, thus an occurring event sequence is not necessarily matched against only one pattern. That is, each of the events of an observed event sequence may be alternately matched against two or more functional specifications (patterns).

From the above first and second points of difference, the verification system according to the present embodiment demands enhancement of the speed compared with a system that performs string pattern matching. However, the speed must stay within a range where a large memory capacity is not consumed. From the third point of difference, a technique for performing a plurality of pattern matching processes in parallel is necessary. To fulfill these needs, the present embodiment introduces a characteristic data structure for describing a state transition of a state machine and interaction between state machines. The data structure is a binary-tree structure and is generated before the target system operates.

The information about the functional specification of the target system may be a sequence diagram for each use case. The binary-tree generating unit may generate the binary trees on the basis of the information about state transitions obtained from the state transition diagrams and information about interactions obtained from the sequence diagram.

The binary-tree generating unit may aggregate non-interactive sub sequences of an action sequence constituting the sequence diagram to generate the binary trees. The non-interactive sub sequences have the same state of the target system at their starting point and the same state of the target system at their end point thereof.

The binary-tree generating unit may generate a graph representing an implication of a plurality of assertions being the states of the target system at starting points of the binary trees. The matching unit may retrieve from the graph an assertion that matches the state of the target system at a starting point of the obtained event sequence. It then may make a binary tree having the retrieved assertion be subjected to the matching of the event sequence.

The matching unit may define a plurality of search spaces corresponding to a plurality of event sequences occurring in the target system in memory and match the event sequences against the binary trees in the plurality of search spaces in parallel therewith.

The matching unit may set a finishing time interval for each of the defined search spaces and terminate processing performed in a search space that reaches the end of the finishing time interval to free up a storage area used by the search space in the memory.

The matching unit may narrow down an event sequence to be subjected to the verification using a software filter that specifies an event that is not to be subjected to the verification from the operation of the target system.

The above system may further include a conversion unit that converts information obtained by a probe provided in the target system together with the operation of the target system into an event sequence in the application model of the target system and transmits the event sequence to the matching unit.

System Configuration

FIG. 1 illustrates a functional configuration of a verification system according to the present embodiment.

A verification system 100 illustrated in FIG. 1 includes an abstract binary tree generation unit 110, an abstract binary tree storage unit 120, a matching unit 130, and an ID filter generation unit 140. The functions of the verification system 100 in the present embodiment are broadly classified into (i) a function performed before a target system operates (or before verification starts) and (ii) a function performed while the target system operates. In FIG. 1, the abstract binary tree generation unit 110 and the ID filter generation unit 140 correspond to the function performed before the target system operates; whereas, the matching unit 130 corresponds to the function performed while the target system operates. As illustrated in FIG. 1, the verification system 100 is connected to a mapping table storage unit 200 and a data converter 300.

The verification system 100 is constructed on a board of the target system (evaluation board or board of an actual device). Accordingly, the functions of the verification system 100 illustrated in FIG. 1 are realized using hardware resources of a system under test (SUT), i.e. the target system. In FIG. 1, the abstract binary tree generation unit 110, matching unit 130, and the ID filter generation unit 140 are realized by a program-controlled central processing unit (CPU) and storage means, such as a random-access memory (RAM). That is, the program is read in the RAM and executed by the CPU, thereby realizing these functions. The abstract binary tree storage unit 120 is realized by storage means, such as a RAM or magnetic disk unit.

The abstract binary tree generation unit 110 generates a binary tree data structure for describing a state transition of a state machine and interaction of state machines (hereinafter referred to as an abstract binary tree). The abstract binary tree is generated before the target system operates and before the verification system 100 starts verification. It is stored in the abstract binary tree storage unit 120. The details of the abstract binary tree and a specific process of generating the abstract binary tree performed by the abstract binary tree generation unit 110 will be described later.

The abstract binary tree storage unit 120 stores an abstract binary tree generated by the abstract binary tree generation unit 110. The abstract binary tree stored in the abstract binary tree storage unit 120 is read and used by the matching unit 130 for verification of the target system by the verification system 100.

The matching unit 130 verifies the target system by matching an event sequence of the target system obtained from the data converter 300 against an abstract binary tree read from the abstract binary tree storage unit 120. The matching unit 130 establishes a new search space in a memory area in a working memory every time an event occurs. It performs matching for the newly occurring event using an abstract binary tree in the newly established search space. A plurality of matching processes are performed in parallel with each other by managing a plurality of search spaces. A specific matching process will be described later.

The ID filter generation unit 140 generates an ID filter for use in the processing performed by the matching unit 130. The ID filter generation unit 140 generates an ID filter using an event filter description and an ID mapping table (described below) and transmits the ID filter to the matching unit 130. The ID filter is a software filter that specifies an event (state transition and interaction) that is to be removed from a search. The details and a specific process of generating the ID filter performed by the ID filter generation unit 140 will be described later.

In the target system, one example of information obtained by a probe is a memory address of a jump destination at the point in time when a jump or a conditional branch occurs. The verification system 100 receives, as an input, an event sequence indicting behavior in an application model and obtained from conversion of the information (hereinafter referred to as a model event sequence). A model event is either a transition event of a predetermined state machine or an interaction event provided by message transmission. To enhance the speed of verification, each of these events is represented by an ID, for example, an integer value, rather than by a state transition or the name of an outgoing message.

The mapping table storage unit 200 maintains a mapping table for converting each state transition in the application model and the name of an outgoing message into an ID. Mapping tables are classified into (i) a mapping table that associates the state transition of a state machine in the application model with a state transition ID and (ii) a mapping table that associates the name of an outgoing message between state machines in the application model with an interaction ID. These mapping tables are used by the abstract binary tree generation unit 110 for generation of an abstract binary tree and by the ID filter generation unit 140 for generation of an ID filter.

The data converter 300 converts information obtained through a probe added to hardware and software of the target system (physical probe and probe code) into a model event sequence in response to operation of the target system. Each model event of the model event sequence is represented by the above described ID. The model event sequence obtained from conversion performed by the data converter 300 is transmitted as a target to the matching unit 130.

Description of Operation of Abstract Binary Tree Generation Unit 110 and Abstract Binary Tree The abstract binary tree generation unit 110 obtains information about a functional specification of the target system and generates an abstract binary tree for use in verification. The functional specification of the target system is described by a state transition diagram of each state machine and an action description written by an action description language. The action description is provided using an original language or an existing programming language. These languages are procedurally represented in most cases, thus it is difficult to make use of the action description itself for verification. For this reason, in the present embodiment, to verify the functional correctness of an entire behavior of the target system, an interaction specification is provided as an input aside from the application model. In the present embodiment, the interaction specification is represented as a set of sequence diagrams.

Figure 2:
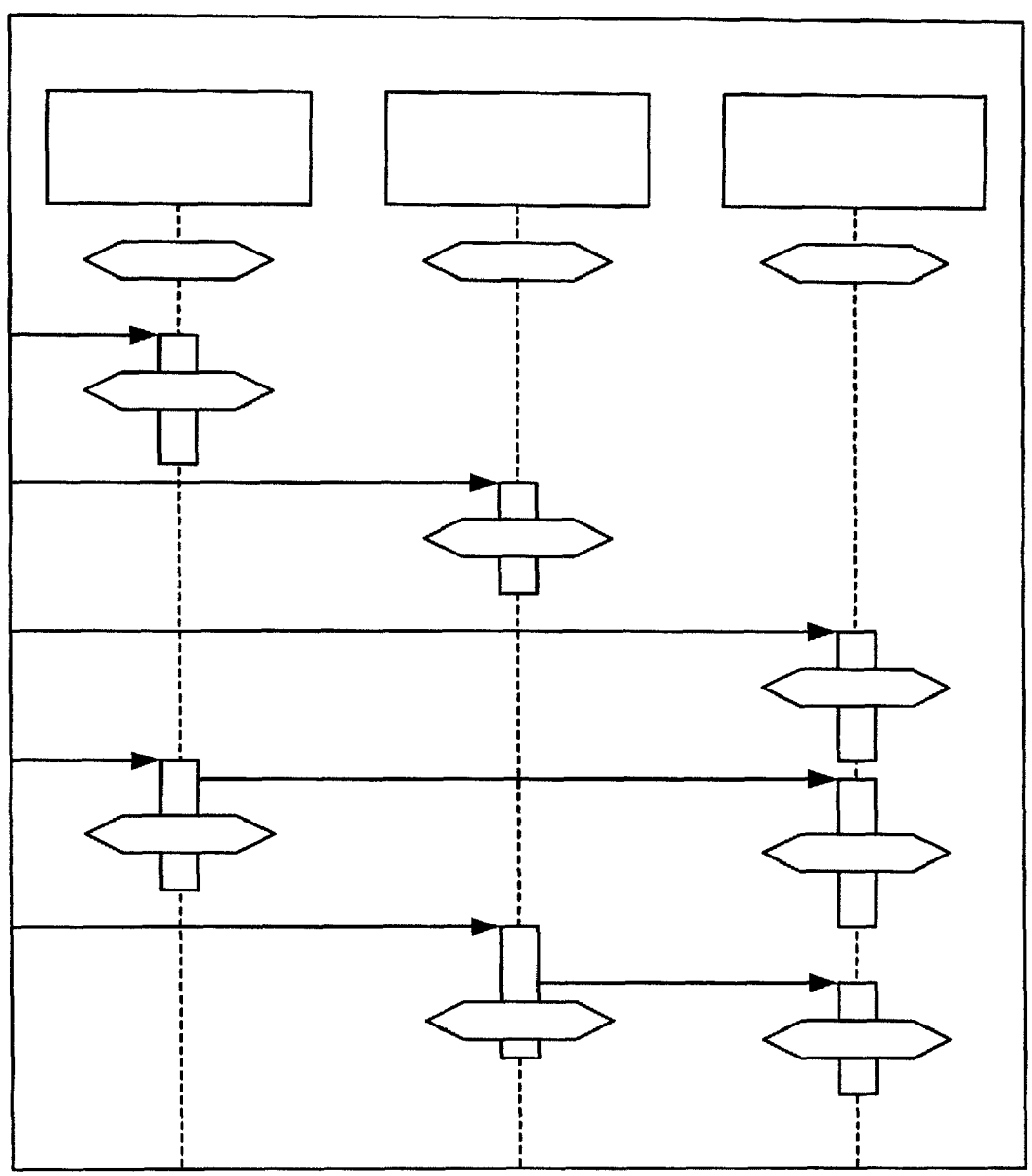
FIG. 2 illustrates an example sequence diagram used in the embodiment.

FIG. 2 illustrates an example sequence diagram. Each sequence diagram defines behavior of the target system in a predetermined use-case scenario. The sequence diagram may be an existing one provided using, for example, UML.

The abstract binary tree generation unit 110 generates an abstract binary tree on the basis of a state transition diagram for the application model and a sequence diagram for an interaction specification. The abstract binary tree is a data structure in which a set of sequence diagrams is reconstructed into a binary-tree structure. In the abstract binary tree, each state that the target system can take is associated with a node. A state transition of each state machine and message passing between the state machines (interaction) are associated with a connection relationship between nodes. Sequence diagrams that have the same state of the target system at their starting points are grouped into one abstract binary tree having a route using a single node.

A binary tree is a data structure typically used in high-speed searching. For the binary tree, the search efficiency largely varies according to what branch condition is set. Therefore, it is important to set the branch condition to correspond to a search target. In the present embodiment, to generate such an abstract binary tree attention is given to the nature of use-case scenarios when an interaction specification is described and the state transition diagram of each state machine provided to the application model.

An interaction specification is defined by sequence diagrams for a plurality of use-case scenarios providing correct functional behavior of the target system. In many cases, the plurality of use-case scenarios are composed of a basic predetermined scenario and a group of scenarios being variations thereof. The variations are produced because there are a plurality of state transitions that can occur under the same specific state for each state machine. Accordingly, as a branch condition for generation of an abstract binary tree, a branch node is generated for a state that has a plurality of possible state transitions and each sequence diagram is arranged in a tree.

Representing the behavior of the target system described in the interaction specification as a binary tree requires an enormous amount of memory usage if all the differences of an event sequence resulting from parallelism of the system operation are recognized. In the present embodiment, to avoid this situation and keep the size of an abstract binary tree practical, some sub sequences are aggregated and abstracted. These are the sub sequences that do not cause interactions, have the same state of the target system at their starting points and have the same state of the target system at their end points.

Figure 3:
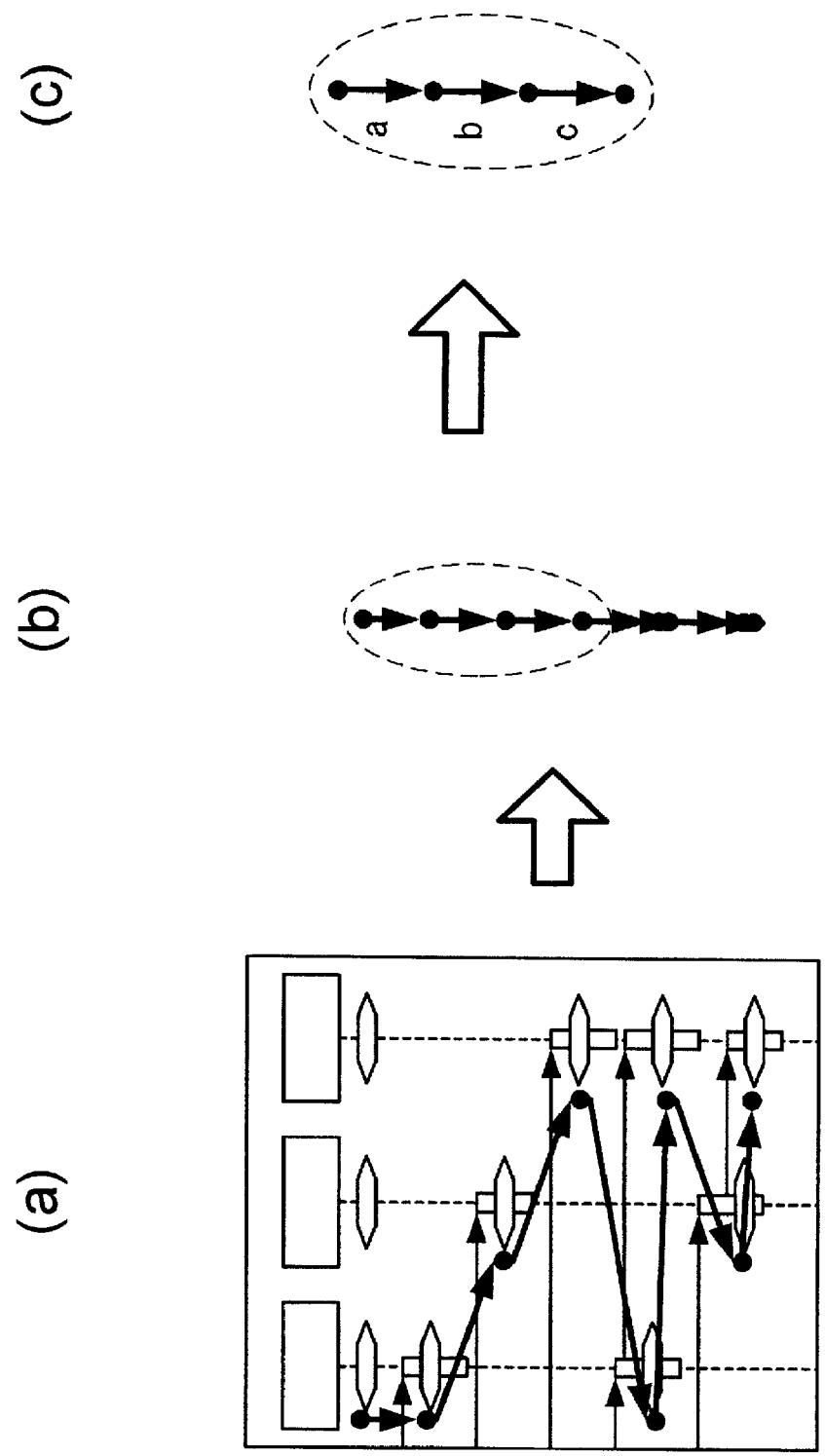
FIG. 3 illustrates an example of abstraction of a binary tree in the course of generation of an abstract binary tree used in the embodiment and illustrates the step of extracting a sub sequence from a sequence diagram.
Figure 4:
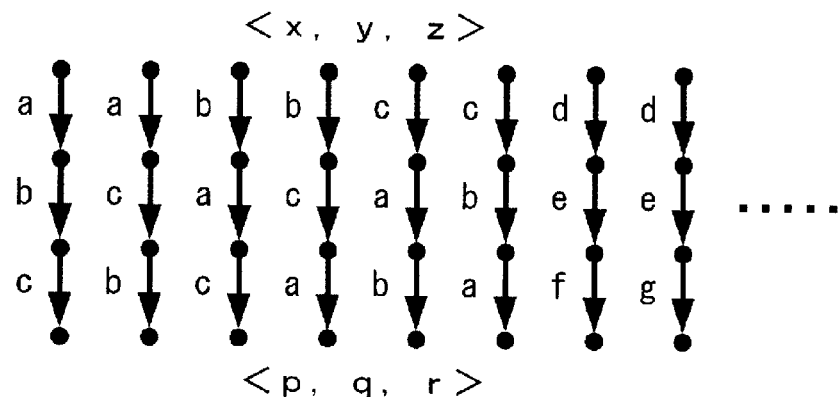
FIG. 4 illustrates an example of abstraction of a binary tree in the course of generation of an abstract binary tree used in the embodiment and illustrates the step of aggregating sub sequences.
Figure 4:
Figure 4:
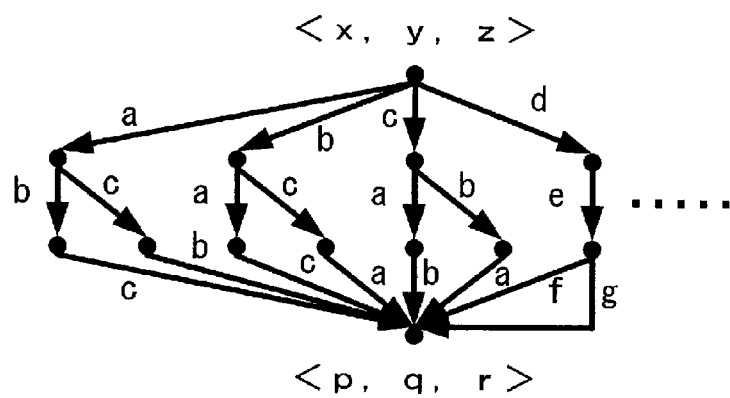
Figure 4:
Figure 4:
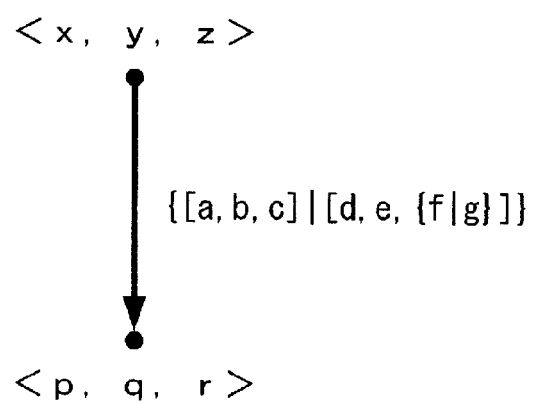

FIGS. 3 and 4 illustrate examples of abstraction of a binary tree.

Referring to FIG. 3, an action sequence, FIG. 3(b), is extracted from a sequence diagram, FIG. 3(a). Focusing on the three upper actions in that sequence, this sub sequence changes from the state <x, y, z> at its starting point to the state <p, q, r> at its end point through the three actions a, b, and c as shown in FIG. 3(c).

Referring then to FIG. 4, there are a plurality of sub sequences whose states change from <x, y, z> at their starting points to <p, q, r> at their end points, as illustrated in FIG. 4(a). This means that a plurality of routes exist in the sub sequences representing the transition from the state <x, y, z> to the state <p, q, r> as illustrated in FIG. 4(b). Looking at FIGS. 4(a) and 4(b) in detail, the state changes from <x, y, z> to <p, q, r> when the three actions a, b, and c occur regardless of the order in which the actions occur. Although not illustrated in FIG. 4, the state changes from <x, y, z> to <p, q, r> when three actions of d and e and either one of f and g occur regardless of the order in which the actions occur. In FIG. 4(c), the routes illustrated in FIG. 4(b) are aggregated and converted into a simple sub sequence representing the transition from the state <x, y, z> to the state <p, q, r>.

Figure 5:
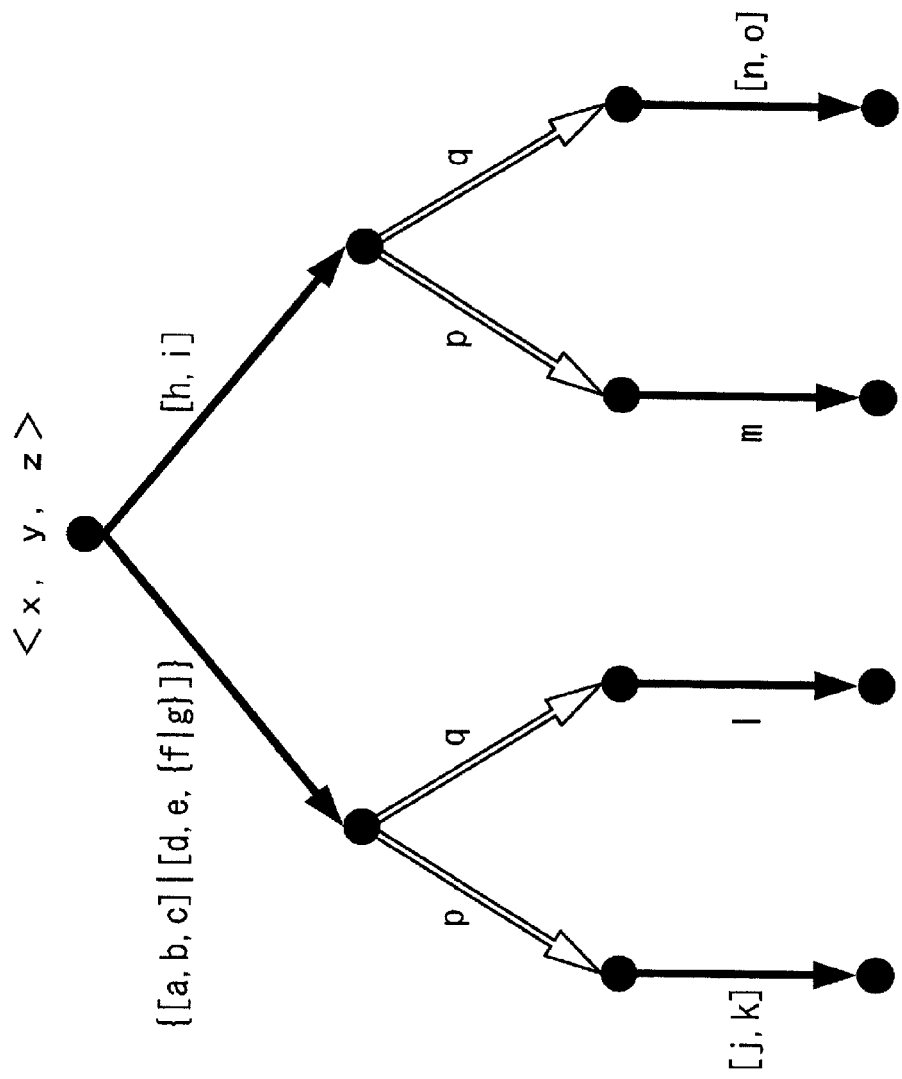
FIG. 5 illustrates an example abstract binary tree used in the embodiment.

Through the above process, the sub sequences that have common states at the starting points and end points are aggregated and the sub sequence that has a different state at the end point is branched and remains. Thus, the abstract binary tree having the state <x, y, z> at the starting point is generated, as illustrated in FIG. 5. The abstract binary tree generation unit 110 generates an abstract binary tree, as illustrated in FIG. 5, for each state of the target system at the starting point in a use-case scenario.

In FIGS. 4(c) and 5, letters between brackets, for example, [a, b], indicates "permutation", which means the elements "a" and "b" are interchangeable. Letters between braces, for example, {j|k}, indicates "selection", which means that either one of the elements j or k is selected. Letters between angle brackets, for example, <x,y>, indicates "concatenation", which means that the elements x and y are both satisfied. In FIG. 5, the sub sequences indicated by the filled arrows represent state transitions, and the sub sequences indicated by the open arrows represent information exchange between state machines (message passing).

Figure 6:
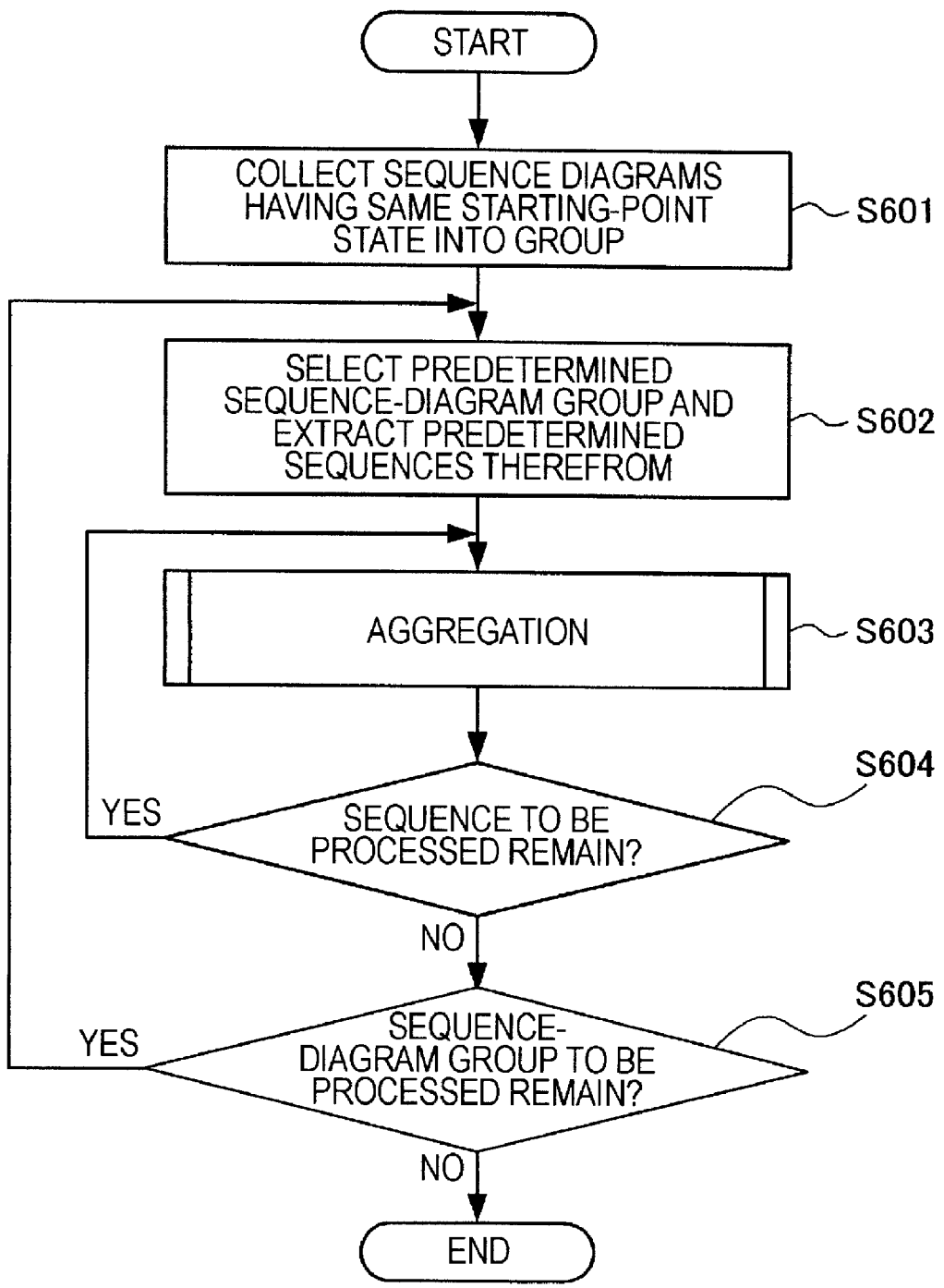
FIG. 6 is a flowchart for describing a process of generating an abstract binary tree used in the embodiment.
Figure 7:
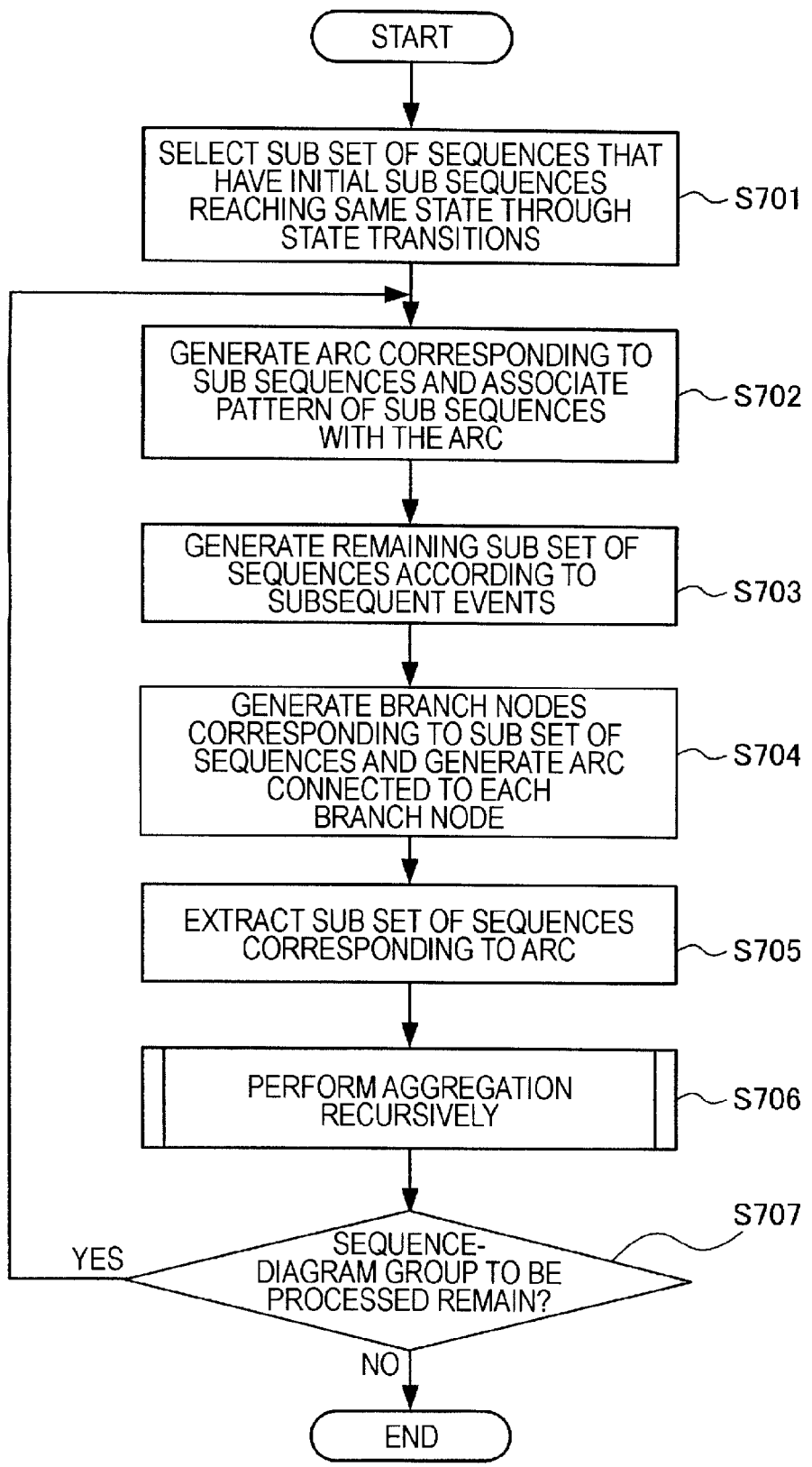
FIG. 7 is a flowchart for describing procedural steps of an aggregation process illustrated in FIG. 6.

FIGS. 6 and 7 are flowcharts for describing a process of generating an abstract binary tree.

As illustrated in FIG. 6, the abstract binary tree generation unit 110 first collects sequence diagrams that have the same state at their starting points into a sequence diagram group (step 601). Then, the abstract binary tree generation unit 110 selects a predetermined sequence diagram group and extracts a predetermined sequence from the sequence diagram group (step 602). Next, the above-described aggregation is performed on the extracted sequence (step 603). The abstract binary tree generation unit 110 performs the aggregation on all sequences in the sequence diagram group selected in step 602. When no sequence remains to be processed (NO in step 604), another sequence diagram group is selected, and step 602 and the subsequent steps are repeated. When no sequence diagram group remains to be processed (NO in step 605), the processing is completed.

FIG. 7 illustrates the procedural steps of the aggregation illustrated in step 603 of FIG. 6. First, from the sequences extracted in step 602, the abstract binary tree generation unit 110 selects a sub set of sequences that have initial sub sequences reaching the same state through state transitions (step 701). Next, an arc corresponding to the sub sequences is generated and associated with the pattern of sub sequences (step 702). Then, the abstract binary tree generation unit 110 generates a remaining sub set of sequences according to the subsequent events, i.e., state transitions and message passing (step 703). Next, branch nodes corresponding to the sub set generated in step 703 and an arc connected to the nodes are generated (step 704). Thereafter, in step 705, the abstract binary tree generation unit 110 extracts a sub set of sequences corresponding to the arc generated in step 704. Then, the abstract binary tree generation unit 110 recursively performs the aggregation on the extracted sub set of sequences (step 706). The abstract binary tree generation unit 110 performs the foregoing process on all sequence diagram groups. When no sequence diagram group remains to be processed (NO in step 707), the processing is completed.

In such a way, sub sequences are aggregated, thus reducing the size of data of an abstract binary tree. However, a plurality of abstract binary trees can be generated depending on the difference of assertions. Specifically, an assertion is the state of the target system at the starting point of a functional specification represented by each abstract binary tree. Therefore, in conducting actual verification it is necessary to search for an abstract binary tree having an assertion that matches the state of the target system when an event sequence (model event sequence) occurs at high speeds. In the present embodiment, the relationship between assertions of abstract binary trees and the establishment of an assertion at a predetermined point in time is determined by use of a determination graph.

The determination graph arranges all assertions by utilizing implications of assertions. For example, three abstract binary trees having assertions <x, y>, <y, z>, and <x, y, z> are discussed. In this case, <x, y> and <y, z> imply <x, y, z>, and <x, y> and <y, z> have a common assertion <y>. That is, if the state of the target system when a predetermined model event sequence occurs does not satisfy <y>, then none of <x, y>, <y, z>, and <x, y, z> are satisfied. Also if <x, y> or <y, z> are not satisfied, then <x, y, z> is not satisfied. In other words, it is necessary to determine whether the target system satisfies <x, y> or <y, z> only if the state of the target system when a predetermined model event sequence occurs satisfies <y>. Also, it is necessary to determine whether the target system satisfies <x, y, z> only if the target system satisfies <x, y> or <y, z>.

Figure 8:
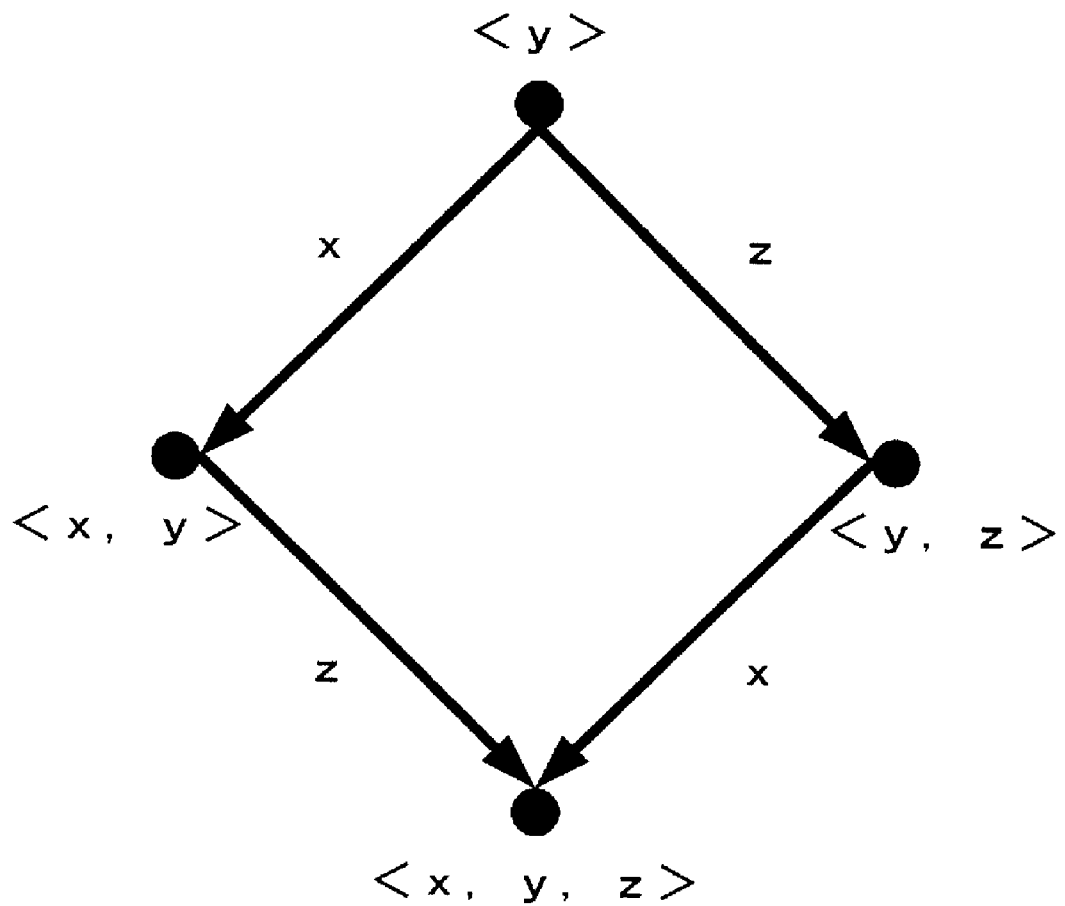
FIG. 8 illustrates an example determination graph used in the embodiment.

FIG. 8 illustrates a determination graph that represents relationships between the above assertions <y>, <x, y>, <y, z>, and <x, y, z>. Following this determination graph enables a search for an abstract binary tree having an assertion that matches the state of the target system when a model event sequence occurs without an unnecessary search. After generating abstract binary trees, the abstract binary tree generation unit 110 generates a determination graph by structuralizing assertions thereof and stores these data structures (abstract binary trees and determination graph) in the abstract binary tree storage unit 120.

In the present embodiment, to realize verification at higher speeds, a model event is represented by an ID, as previously described. To support this, the abstract binary tree generation unit 110 obtains a mapping table of state transition IDs and a mapping table of interaction IDs from the mapping table storage unit 200 and converts an interaction specification provided as an input such that an event can be identified by an ID. This conversion is performed as pre-processing before an abstract binary tree is generated.

Description of Operation of Matching Unit 130

When the target system operates, data is obtained by a probe in response to behavior. The obtained data is converted into an event sequence in the application model by the data converter 300, and the converted data is supplied in real time to the matching unit 130 as a stream input. The matching unit 130 obtains the model event sequence from the data converter 300 and verifies the target system by matching the model event sequence against abstract binary trees stored in the abstract binary tree storage unit 120.

Figure 9:
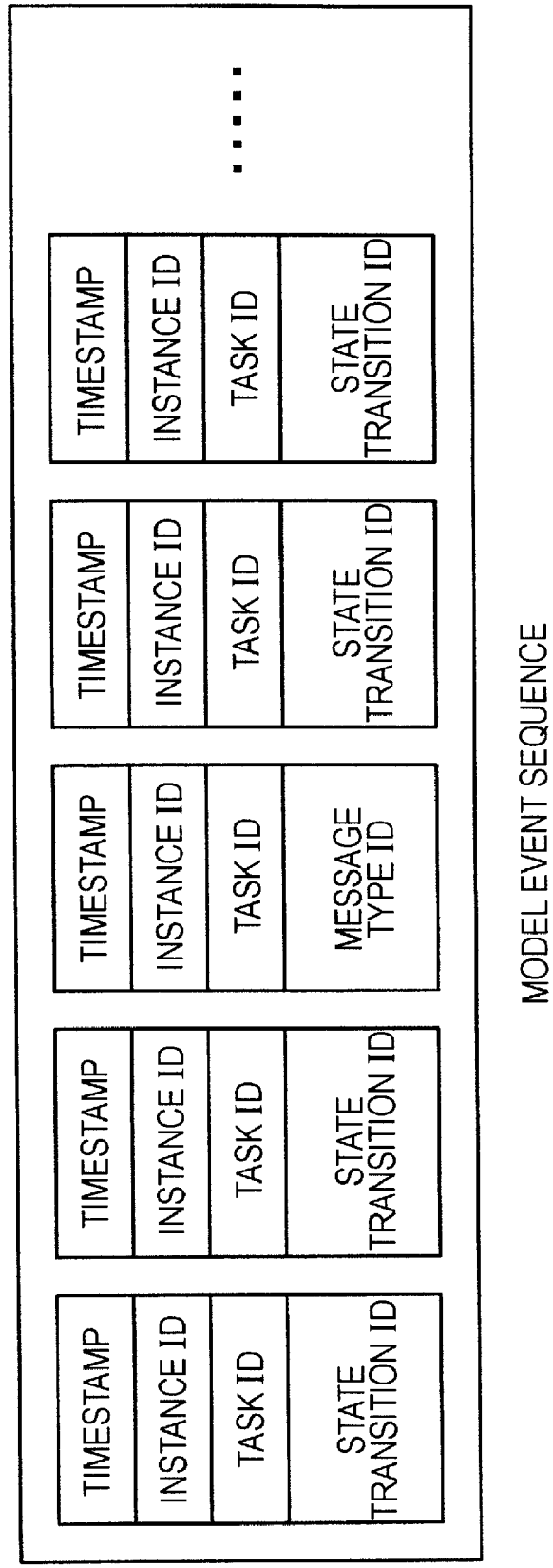
FIG. 9 illustrates an example data structure of a model event sequence input to a verification system according to the embodiment.

FIG. 9 illustrates an example data structure of a model event sequence transmitted from the data converter 300 to the matching unit 130.

As illustrated in FIG. 9, the model event sequence includes, for each event task, a "timestamp", a "status machine ID" (instance ID), a "task ID", and an ID for the event, either "state transition ID" or "interaction ID" (message type ID), which are aligned.

Figure 10:
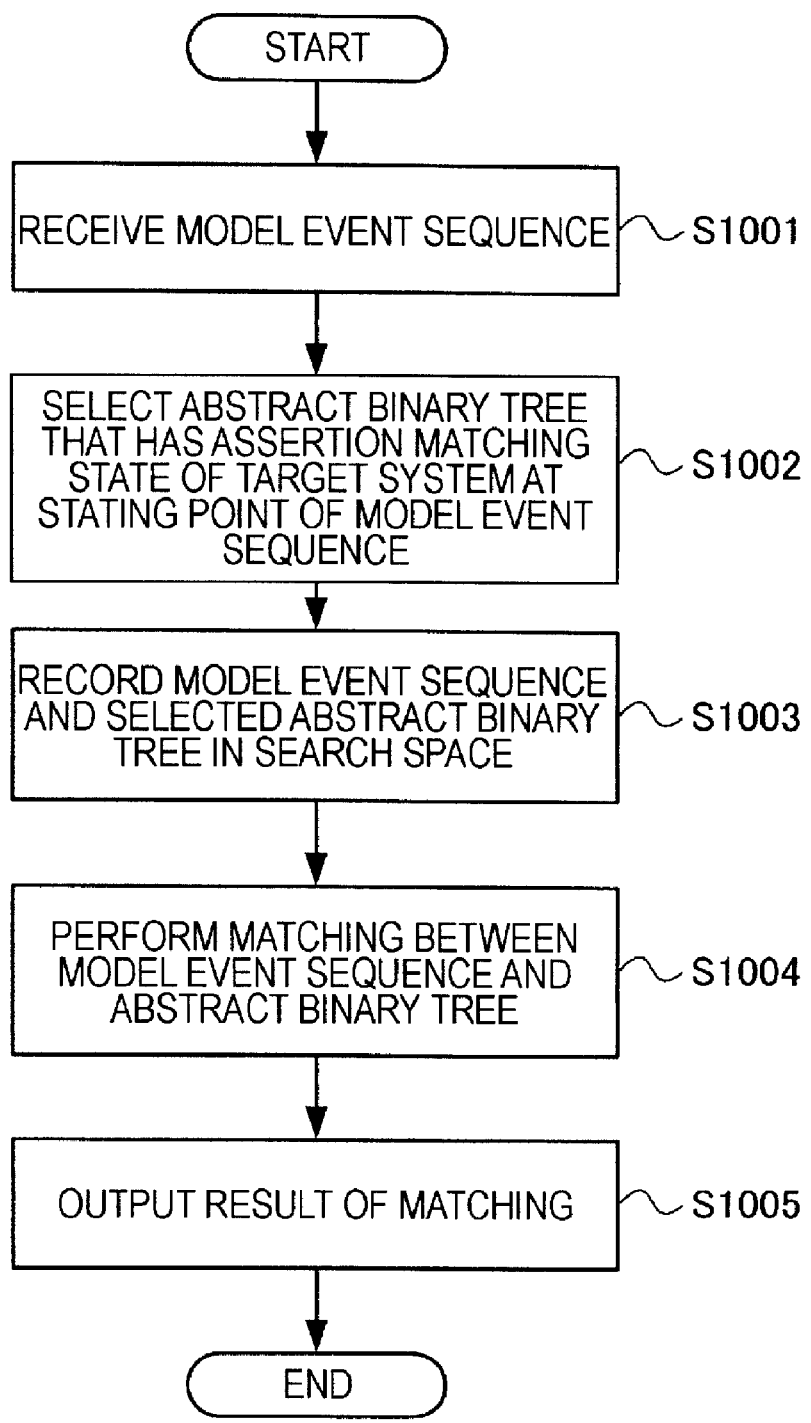
FIG. 10 is a flowchart for describing an operation of a matching unit in the embodiment.

FIG. 10 is a flowchart describing the operation of the matching unit 130.

As illustrated in FIG. 10, the matching unit 130 receives a model event sequence from the data converter 300 (step 1001). The matching unit 130 then selects an abstract binary tree having an assertion that matches the state of the target system at the starting point of the received model event sequence (step 1002). The matching unit 130 establishes a search space in a working memory and records the model event sequence and the abstract binary tree in the search space (step 1003). Matching processes between the model events and the binary trees are sequentially performed for each of the model events (step 1004). Then, the result of the matching is output as the result of verification (step 1005).

When there is no abstract binary tree that matches the model event sequence received in step 1001, this means that this model event sequence deviates from the functional specification of the target system. In this case, the matching unit 130 outputs the state of the target system at which that deviation is detected and the history of behavior until it reaches that state together with the result of the matching as the result of verification. When there is an abstract binary tree that matches the model event sequence received in step 1001, this means that the target system operates within the functional specification thereof. Accordingly, there is no need to output any results.

In a real-time system or an embedded system, a plurality of system operations may be performed in parallel with each other, so a plurality of events may occur simultaneously. Because of this, the matching unit 130 determines a satisfied assertion using a determination graph for assertions described above every time a model event occurs. When there is an abstract binary tree that matches the assertion, the matching unit 130 establishes a new search space and performs matching using this abstract binary tree. In such a way, the matching unit 130 can perform matching (verification) by managing a plurality of search spaces.

In a real-time system or an embedded system, predetermined functions or operations of components operating in parallel may be stopped as a result from an external environment or a user operation. For this reason, when processes are performed in parallel in a plurality of search spaces, a finishing time interval (timeout) can be set for each of the search spaces. When a process that is being stopped in a predetermined search space exceeds the end of the finishing time interval, the matching process in the search space is terminated and the memory area used by that search space is forcibly freed up. This can prevent excessive consumption of memory resources caused by continuously increasing search spaces. When there remains a candidate for an abstract binary tree during matching at the time the matching process is terminated, the matching is considered to be unsuccessful. To restart the matching process after the timeout, the matching process restarts after it is determined whether an assertion is satisfied without matching of a model event at the restarting point of the matching process.

As described above, when the target system operates, a model event sequence from the data converter 300 is transmitted in real time to the matching unit 130. As a result, if the matching unit 130 starts a matching process during the operation of the target system an abstract binary tree may not be matched because a process performed by a predetermined function is in progress. Therefore, as an operation at the starting point of the matching process, without matching of a model event at that time, it waits until an abstract binary tree having an assertion that matches the state of the target system appears. Then, after it is determined whether the assertion is satisfied, the matching process is started. This can prevent outputting of incorrect detection results caused by the fact that an assertion is not matched even though there is an abstract binary tree that matches a model event sequence.

Depending on the aim or content of verification, a particular one of the state machines constituting the target system or system operations may not be subjected to the matching. To enhance the speed of a matching process and avoid incorrect determination, an ID filter generated by the ID filter generation unit 140 is used. The ID filter generation unit 140 obtains an event filter description (model-level filter) that describes an event to be removed from the verification by filtering. The event filter description is converted into an ID filter that describes a state transition ID and message type ID from a mapping table stored in the mapping table storage unit 200.

The matching unit 130 can narrow down the target model event sequence by removing the state transition ID and message type ID from the verification. For example, when an ID filter that removes a predetermined state machine from verification is generated, a state transition in this state machine and a message event that reaches this state machine are removed from the verification. In this case, a message event that is transmitted from this state machine is not removed from the verification because that event has an effect on the state transitions of other state machines.

The present invention further provides a method for verifying operation of a target system to be inspected. The method includes an obtaining step of obtaining a state transition diagram of each object and a sequence diagram for each use case of the target system as information about a functional specification of the target system, a binary-tree generating step of generating one or more binary trees that associate one or more states that can occur in the target system with respective nodes on the basis of information about state transitions obtained from the state transition diagrams and information about interactions obtained from the sequence diagram and that associate state transitions of the objects constituting the target system and interactions between the objects with connection relationships between the nodes, and a matching step of receiving an event sequence in an application model of the target system obtained in response to the operation of the target system and of matching the event sequence against the generated binary trees.

The present invention still further provides a computer readable article of manufacture that serves the functions of the above system by controlling a computer or making a computer execute processes corresponding to the steps in the above method. The computer readable article of manufacture can be provided by magnetic disks, optical disks, semiconductor memories, or other storage media.

While the invention has been particularly described in conjunction with a specific preferred embodiment and other alternative embodiments, it is evident that numerous alternatives, modifications and variations will be apparent to those skilled in the art in light of the foregoing description. It is therefore intended that the appended claims embrace all such alternatives, modifications and variations as falling within the true scope and spirit of the invention.

We claim:

1. A system for verifying operation of a target system to be inspected, the system comprising:
    a binary-tree generating unit; and
    a matching unit;
    wherein the binary-tree generating unit obtains information about a functional specification of the target system and generates one or more binary trees that associate (1) one or more states that can occur in the target system with respective nodes and (2) state transitions of objects constituting the target system and interactions between the objects with connection relationships between the nodes; and
    wherein the matching unit receives an event sequence in an application model of the target system obtained in response to the operation of the target system to match the event sequence against the binary trees generated by the binary-tree generating unit.

2. The system according to claim 1, wherein the binary-tree generating unit obtains a state transition diagram of each of the objects and a sequence diagram for each use case of the target system as information about a functional specification of the target system and generates the binary trees based on the information about state transitions obtained from the state transition diagrams and information about interactions obtained from the sequence diagram.

3. The system according to claim 2, wherein the binary-tree generating unit aggregates non-interactive sub sequences of an action sequence constituting the sequence diagram, the non-interactive sub sequences having a same state of the target system at their starting point and a same state of the target system at their end point thereof, to generate the binary trees.

4. The system according to claim 1, wherein:
    the binary-tree generating unit generates a graph representing an implication of a plurality of assertions being the states of the target system at starting points of the binary trees, and
    the matching unit retrieves an assertion that matches the state of the target system at a starting point of the obtained event sequence from the graph and makes a binary tree having the retrieved assertion be subjected to the matching of the event sequence.

5. The system according to claim 1, wherein the matching unit defines a plurality of search spaces corresponding to a plurality of event sequences occurring in the target system in memory and matches the event sequences against the binary trees in the plurality of search spaces in parallel therewith.

6. The system according to claim 5, wherein the matching unit sets a finishing time interval for each of the defined search spaces and terminates processing performed in a search space that reaches the end of the finishing time interval to free up a storage area used by the search space in the memory.

7. The system according to claim 1, wherein the matching unit narrows down an event sequence to be subjected to the verification using a software filter that specifies an event that is not to be subjected to the verification from the operation of the target system.

8. The system according to claim 1, further comprising a conversion unit for converting information obtained by a probe provided in the target system together with the operation of the target system into an event sequence in the application model of the target system and transmitting the event sequence to the matching unit.

9. A method of verifying operation of a target system to be inspected, the method comprising the steps of:
obtaining a state transition diagram of each object and a sequence diagram for each use case of the target system as information about a functional specification of the target system;
generating one or more binary trees that associate one or more states that can occur in the target system with respective nodes based on information about state transitions obtained from the state transition diagrams and information about interactions obtained from the sequence diagram and that associate state transitions of the objects constituting the target system and interactions between the objects with connection relationships between the nodes; and
receiving an event sequence in an application model of the target system obtained in response to the operation of the target system and matching the event sequence against the generated binary trees.

10. The method according to claim 9, wherein the binary-tree generating step further includes the step of aggregating non-interactive sub sequences of an action sequence constituting the sequence diagram, the non-interactive sub sequences having the same state of the target system at their starting points and the same state of the target system at their end points, to generate the binary trees.

11. The method according to claim 9, further comprising the steps of:
generating a graph representing an implication of a plurality of assertions being the states of the target system at starting points of the binary trees; and
retrieving an assertion that matches the state of the target system at a starting point of the obtained event sequence from the graph and making a binary tree having the retrieved assertion be subjected to the matching of the event sequence.

12. A computer readable article of manufacture tangibly embodying computer readable instructions for executing the steps of a method of verifying operation of a target system to be inspected, the method comprising:
obtaining information about a functional specification of a target system to be inspected and generating one or more binary trees that associate one or more states that can occur in the target system with respective nodes and that associate state transitions of objects constituting the target system and interactions between the objects with connection relationships between the nodes; and
receiving an event sequence in an application model of the target system obtained in response to the operation of the target system and matching the event sequence against the binary trees generated by the binary-tree generating means.

13. The computer readable article according to claim 12, wherein the method further comprises the steps of:
obtaining a state transition diagram of each of the objects and a sequence diagram for each use case of the target system as the information about the functional specification of the target system; and
generating the binary trees on the basis of information about state transitions obtained from the state transition diagrams and information about interactions obtained from the sequence diagram.

14. The computer readable article according to claim 13, wherein the method further comprises the step of:
aggregating non-interactive sub sequences of an action sequence constituting the sequence diagram, the non-interactive sub sequences having the same state of the target system at their starting points and the same state of the target system at their end points, to generate the binary trees.

15. The computer readable article according to claim 12, wherein the method further comprises the steps of:
generating a graph representing an implication of a plurality of assertions being the states of the target system at starting points of the binary trees; and
retrieving an assertion that matches the state of the target system at a starting point of the obtained event sequence from the graph and making a binary tree having the retrieved assertion be subjected to the matching of the event sequence.

* * * * *